F. S. ELLETT.
MOTOR CYCLE.
APPLICATION FILED JUNE 16, 1916.
1,258,547. Patented Mar. 5, 1918.
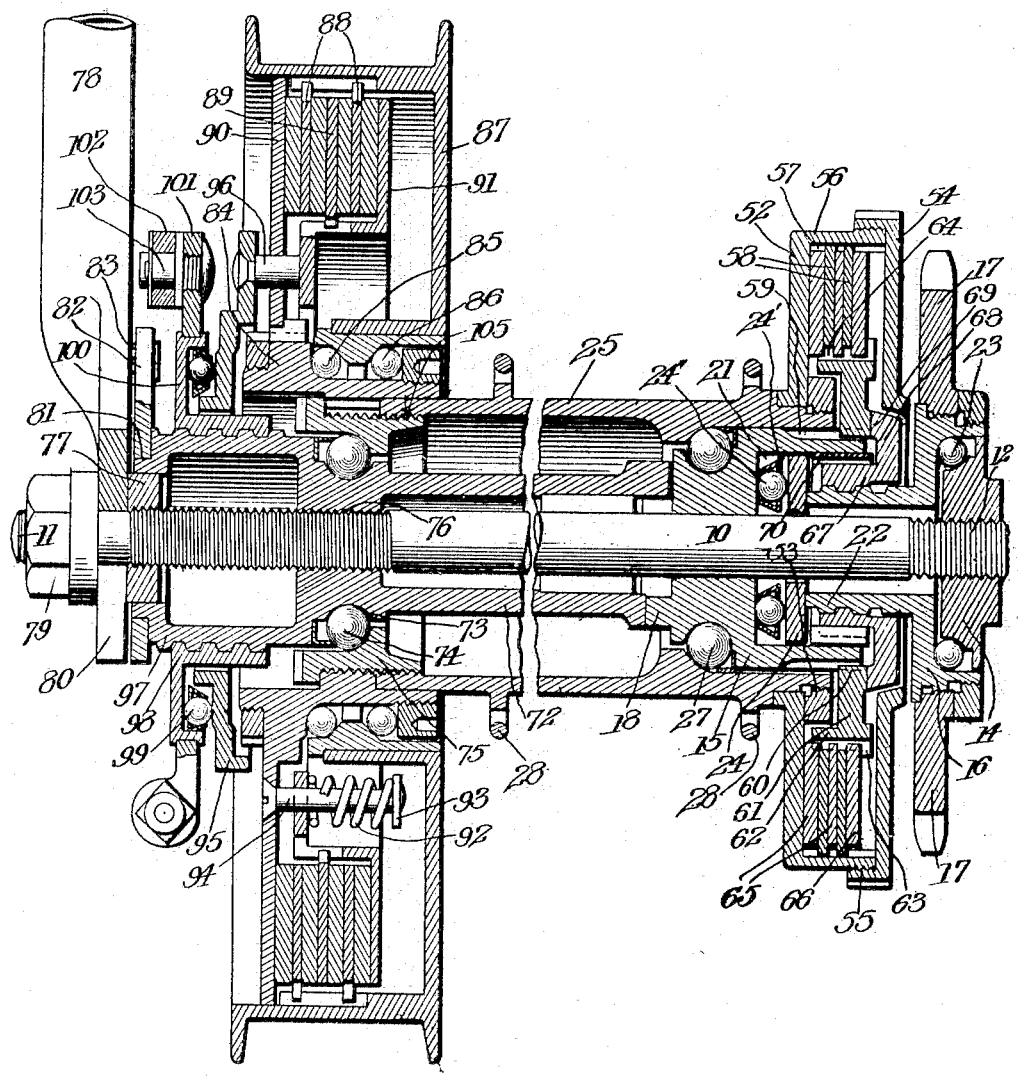
Witness
G. T. Baker,
T. L. Kelley
Inventor
F. S. Ellett
By Foster Freeman Watson & Coit
Attorney

UNITED STATES PATENT OFFICE.

FREDERICK S. ELLETT, OF ELMIRA, NEW YORK.

MOTOR-CYCLE.

1,258,547.   Specification of Letters Patent.   Patented Mar. 5, 1918.

Original application filed January 9, 1913, Serial No. 741,089. Divided and this application filed June 16, 1916. Serial No. 104,015.

*To all whom it may concern:*

Be it known that I, FREDERICK S. ELLETT, a citizen of the United States, and resident of Elmira, Chemung county, State of New York, have invented certain new and useful Improvements in Motor-Cycles, of which the following is a specification.

This invention which is a division of my application No. 741,089, filed January 9, 1913, relates to motor cycles and more particularly to the construction of the driving wheel hub thereof. The objects of the invention are to provide such a hub equipped with a back pedaling brake at one end and at the other end a free wheel which may be locked to the barrel by a friction clutch. In motor cycle construction there are conditions which restrict the length of the hub and it has been impracticable in the constructions heretofore used to combine a brake, and a free wheel, arranged exteriorly of the hub bearings, where they are readily accessible and may be adjusted or repaired without disturbing the hub bearings. According to this invention it is practicable to equip the hub with a brake arranged at one end of the same and a free wheel and clutch arranged at the other end, by transmitting all of the forces which resist turning of certain parts of the brake, to the frame at the free wheel end of the hub.

These and other features of the invention will be described in connection with the drawing and pointed out in the appended claims.

In the drawing the single figure is a longitudinal sectional view of the preferred embodiment of the invention.

The mechanism comprises an axle member 10 having the threaded ends 11 and 12. A tubular member engages the threaded end 11 at 76 and a bearing member 14 engages the end 12. A second tubular member 15 is arranged on the axle 10 and a driving member 16 which has secured thereto a sprocket 17 is rotatably supported on the bearing member 14. The members 72 and 15 are provided with interlocking teeth or projections 18 on their adjacent ends, and the outer end 81 of the member 72 is made angular in form and has fitted thereon an arm 82 which is secured to the frame of the motor cycle and holds the members 72 and 15 against rotation. The outer side of the member 15 is provided with a recess 21 into which extends the exteriorly threaded extension 22 of the driving member 16. The outer side of the driving member 16 is recessed to form a space for the balls 23 which are arranged between the driving member and the bearing member 14 and form a thrust bearing adapted to take up the outward thrust on the driving member. A bearing ring 24 engages the inner end of the extension 22 and between this ring and the member 15 is a cage 24' having arranged therein the balls 24", which transmit thrust from the driving member to the member 15.

A hub barrel 25 is rotatably mounted on the ball bearings 27 and 74, arranged on the members 15 and 72 respectively. The ball bearing 74 includes the race 73 formed in the member 72 and the outer ring 75 which is threaded into the hub as at 105. The barrel 25 is provided with the flanges 28 to which the spokes of the wheel may be attached.

A member or casing 52 is secured on one end of the barrel 25 in any suitable manner, as by means of the nut 53 and carries an end plate 54 which is secured thereto by the screw threads 55 or in any other suitable manner. The axially extending flange 56 of the member 52 is provided with internal recesses or keyways 57 which receive the outward projections on the friction disks 58 and thus cause these disks to rotate with the wheel.

The member 15 is provided with a series of external longitudinally extending grooves or keyways 59 which receive the inward projections 60 on the ring 61, this ring being provided with the axially extending flange 62 and the radially extending flange 63. The ring 61 is also provided with grooves or keyways 64 which receive the inward projections on the friction disks 65 and the ring or plate 66, the latter engaging the flange 63 and being held thereby against axial movement in an outward direction, on the ring 61.

An internally threaded sleeve 67 engages the threaded extension 22 on the driving member 16 and is provided with a radial flange 68 having a circumferential extension 69 which engages the outer side of the ring 61. A spring 70 having one end thereof secured to the sleeve 67 is arranged between the latter and the inner wall of the member 15 and bears against the latter, thus forming a frictional retarding means for the sleeve 67.

The periphery of the flange 68 is conical in form and adapted to engage the conical inner surface of the plate 54 to form a frictional driving connection between the sleeve 67 and the hub barrel 25.

The mechanism just described constitutes a coaster or back pedaling brake which is operated as follows: The sprocket 17 is driven by means of a chain from the usual pedals, with which motor cycles are provided and by rotating the member 16 in one direction the sleeve 67 will be moved into engagement with the plate 54 and form a driving connection between the member 16 and the hub barrel 25, whereby the motor cycle may be operated by means of the pedals. When the member 16 is rotated in the opposite direction by back pedaling, the sleeve 67 is caused to move inwardly and carries with it the ring 61, thereby compressing the friction disks between the member 52 and the disk 66. Since the disks 65 are held against rotation, the hub barrel will be retarded by the frictional engagement of these disks with the disks 57.

At the end of the hub, opposite the back pedaling brake a free wheel is adapted to be connected to the hub, to drive the latter, by means of a clutch. The axle member has arranged thereon a nut or collar 77 which fits on the interior of the member 72 and thus supports the latter. The axle member 10 is secured to a frame member 78 in any preferred manner, as for example, by means of the nut 79, between which and the collar 77, the flattened portion 80 of the frame member is clamped. At its outer end the member 72 is preferably formed with an angular portion 81 on which is mounted an arm 82, this arm being secured to the frame member 78 as shown at 83, and thus holding the member 72 against rotation.

A sleeve 84 is secured to the end of the hub 25 and has arranged thereon sets of balls 85 and 86, on which is mounted the wheel 87. The wheel 87 carries on its interior the friction disks 88 which coöperate with the disk 89 and the plates 90 and 91 to form a driving connection between the wheel and the hub barrel. The plates 90 and 91 are secured on the sleeve 84 but the plate 91 is free to move axially on the sleeve. Springs, which are arranged in a circle and one of which is shown at 92, bear against the plate 91 and abutments 93 carried by screws or pins 94 which are secured in the plate 90, these springs, as will be readily understood, normally tending to move the plates 90 and 91 together to compress the friction disks.

In order to effect an ungripping of the friction disks the plate 91 is moved toward the right by means of a plate 95 which is connected with the plate 91 by pins 96 which pass through suitable openings in the plate 90. The member 72 has arranged on the exterior thereof the screw threads 97 which are engaged by the internally threaded sleeve or nut 98. Balls 99 are arranged between the plate 95 and a radially extending flange 100 on the sleeve 98 and thus provide a thrust bearing between these parts. An actuating arm 101 is secured to the flange 100 and arranged to be actuated by a member 102 which is connected with a pivot 103 carried by the arm.

As thus constructed the springs 92 normally hold the friction disks in gripping engagement so that the wheel 87 is locked to the hub member 25. When it is desired to ungrip the clutch members the sleeve 98 is turned on the member 72 and thus caused to move axially thereon and carry with it the plates 91 and 95, whereby the springs 92 are compressed and the friction disks permitted to become disengaged. By turning the sleeve 98 in the opposite direction the springs 92 will again move the friction disks into gripping engagement and lock the wheel 87 to the hub member.

From the above, it will be seen that I have provided a hub construction embodying a coaster brake and a clutch which are independently operable and which are also arranged on the exterior of the hub barrel and are readily accessible without disturbing the bearings of the hub barrel. It will also be observed that by the arrangement of the interlocking tubular members 72 and 15, all of the braking strain is carried to one side of the hub and transmitted to the frame through the arm 82.

It will be understood by those skilled in the art that various changes may be made in the details of construction within the scope of the appended claims and since the construction shown and described is merely illustrative of one form in which the invention may be embodied, I do not wish to be limited to these precise details.

Having thus described the invention, what is claimed and desired to be secured by Letters Patent is:

1. In a motor cycle, the combination of a stationary axle member, a hub barrel rotatably mounted on opposed bearings at the ends thereof, a friction member carried by said barrel at one end thereof, a coöperating friction member, means secured at the opposite end of said barrel and connected therethrough with said coöperating friction member to hold the latter against rotation, a back pedaling device at the end of said barrel adjacent said friction members for effecting a gripping and ungripping of the friction members, a driving member at the opposite end of the hub and rotatable relative to the hub, and means adjacent the driving member for locking the latter to the hub.

2. In a motor cycle, the combination of a stationary axle member, a hub barrel rotatably mounted on opposed bearings at the ends thereof, a friction member carried by said barrel at one end thereof exteriorly of the hub bearings, a coöperating non-rotatable friction member, a back pedaling device at the end of said barrel adjacent said friction members for effecting a gripping and ungripping of the friction members, a driving member at the opposite end of the hub and rotatable relative to the hub, and friction means for locking said driving member to the hub.

3. In a motor cycle, the combination of a stationary axle member, a hub barrel rotatively mounted and surrounding said axle, a back pedaling brake arranged at one end of the hub barrel and operatively connected therewith, a device extending through the hub barrel and non-rotatively connected to one member of the brake and held against rotation at the opposite end of the hub barrel, a driving member rotatively mounted on the hub, clutch means for connecting the driving member to the hub, and means for controlling the clutch, mounted on the said device.

In testimony whereof I affix my signature.

FREDERICK S. ELLETT.

Copies of this patent may be obtained for five cents each, by addressing the "Commissioner of Patents, Washington, D. C."